United States Patent
Lifshitz et al.

(10) Patent No.: US 11,588,693 B2
(45) Date of Patent: Feb. 21, 2023

(54) MIGRATING NETWORKING CONFIGURATIONS

(71) Applicant: RED HAT, INC., Raleigh, NC (US)

(72) Inventors: Yuval Lifshitz, Raanana (IL); Sebastian Scheinkman, Raanana (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/801,940

(22) Filed: Feb. 26, 2020

(65) Prior Publication Data
US 2021/0266224 A1    Aug. 26, 2021

(51) Int. Cl.
| | |
|---|---|
| H04L 41/084 | (2022.01) |
| H04L 41/08 | (2022.01) |
| H04L 41/0873 | (2022.01) |
| H04L 9/40 | (2022.01) |
| G06F 9/455 | (2018.01) |
| H04L 41/22 | (2022.01) |

(52) U.S. Cl.
CPC ...... *H04L 41/0843* (2013.01); *G06F 9/45558* (2013.01); *H04L 41/0873* (2013.01); *H04L 41/0886* (2013.01); *H04L 41/22* (2013.01); *H04L 63/0263* (2013.01); *G06F 2009/4557* (2013.01); *G06F 2009/45595* (2013.01)

(58) Field of Classification Search
CPC ..... H04L 47/78; H04L 47/82; H04L 41/0843; H04L 41/0873; H04L 41/0886; H04L 41/22; H04L 63/0263; G06F 9/45558; G06F 2009/4557; G06F 2009/45595
See application file for complete search history.

(56) References Cited

U.S. PATENT DOCUMENTS

| | | | |
|---|---|---|---|
| 9,547,516 B2 | 1/2017 | Thakkar et al. | |
| 10,013,276 B2 | 7/2018 | Fahs et al. | |
| 10,397,255 B1* | 8/2019 | Bhalotra | H04L 63/1425 |
| 10,740,362 B2* | 8/2020 | Agrawal | G06F 16/285 |
| 10,931,507 B2* | 2/2021 | Cherunni | H04L 41/02 |
| 10,944,691 B1* | 3/2021 | Raut | H04L 47/82 |
| 11,163,614 B1* | 11/2021 | Francisco | G06F 9/5088 |
| 11,175,965 B2* | 11/2021 | McClymont | G06F 9/5077 |
| 11,188,661 B2* | 11/2021 | Peng | H04L 63/105 |
| 11,422,844 B1* | 8/2022 | Filiz | H04L 67/10 |

(Continued)

OTHER PUBLICATIONS

Nider, "Cross-ISA Container Migration", SYSTOR 2016 Proceedings of the 9th ACM International on Systems and Storage Conference, Jun. 2016.*

(Continued)

*Primary Examiner* — Todd L Barker
(74) *Attorney, Agent, or Firm* — Womble Bond Dickinson (US) LLP

(57) ABSTRACT

A method includes receiving, from an agent executing in a virtual machine, network information associated with the virtual machine, the virtual machine to be migrated to a container. The method further includes generating a container networking configuration based on the network information. The container networking configuration is to provide network access to processes migrated from the virtual machine to the container. The method further includes providing the container networking configuration to a container orchestration system. The container orchestration system is to use the container networking configuration to provide network access to the container.

18 Claims, 6 Drawing Sheets

(56) References Cited

U.S. PATENT DOCUMENTS

| | | | |
|---|---|---|---|
| 2015/0163192 A1* | 6/2015 | Jain | H04L 43/04 |
| | | | 370/255 |
| 2016/0274928 A1* | 9/2016 | Linton | G06F 9/45558 |
| 2017/0180249 A1* | 6/2017 | Shen | G06F 9/45558 |
| 2017/0270449 A1* | 9/2017 | Shrimali | G06F 8/00 |
| 2017/0272400 A1* | 9/2017 | Bansal | G06F 9/5077 |
| 2017/0359414 A1* | 12/2017 | Sengupta | G06F 9/45558 |
| 2018/0053001 A1* | 2/2018 | Folco | G06F 21/53 |
| 2019/0014154 A1* | 1/2019 | Vaidya | G06F 21/56 |
| 2019/0104111 A1* | 4/2019 | Cidon | H04M 15/00 |
| 2019/0215332 A1 | 7/2019 | Kaplan et al. | |
| 2019/0266502 A1* | 8/2019 | Moser | G06F 11/079 |
| 2019/0324786 A1* | 10/2019 | Ranjan | G06F 9/5077 |
| 2019/0347127 A1 | 11/2019 | Coady et al. | |
| 2020/0036593 A1* | 1/2020 | Sethi | H04L 41/5019 |
| 2020/0322263 A1* | 10/2020 | Wu | H04L 47/762 |
| 2021/0132974 A1* | 5/2021 | Watt, Jr | G06F 9/4856 |
| 2021/0240734 A1* | 8/2021 | Shah | G06F 9/5072 |
| 2022/0101466 A1* | 3/2022 | Morrison | G06Q 10/06311 |

OTHER PUBLICATIONS

Tosatto, "Conainer Based Orchestration in Cloud: State of the Art and Challenges", 2015 Ninth International Conference on Complex, Intelligent, and Software Intensive Systems, Jul. 2015.*

Jananthanan, "Policies Based Container Migration Using Cross-Cloud Management Platform", 2018 IEEE international Conference on Infomration and Automation for Sustainability, Dec. 2018.*

Janarthanan et al, "Policies Based Contaqiner Migration Using Cross-Cloud Management Platform", Dec. 2018.*

Naresh, "Comparing Live Migration between Linux Containers and Kernel Viirtual Machine" Feb. 2017.*

Li et al., "Comparing Containers versus Virtual Machines for Achieving High Availability", 2015 IEEE International Conference on Cloud Engineering, Mar. 9, 2015.*

Zhang et al., "Dynamic Adaptive Network Edge Service Migration Method Based on a Docker Container", 2019 IEEE 5th International Conference on Computer and Communications (ICC), Dec. 6, 2019.* ip.com_npl, "A total solution formgirating a virtual machine to docker", Apr. 18, 2016.*

"4 Strategies for Incrementally Migrating from VMs to Kubernetes using an API Gateway" Ambassador, Jan. 9, 2020, 6 pages.

"Transition of Virtual Machines to Oracle Cloud Inrastructure" Oracle (2019), 2 pages.

"Moving a VM Based App to Kubernetes" (Dec. 12, 2019). IBM Cloud Docs, 11 pages.

Deshpande, U. et al. "Traffic-Sensitive Live Migration of Virtual Machines". Binghamton University, Binghamton, NY; Argonne National Lab, Lemont, IL, 10 pages.

* cited by examiner

US 11,588,693 B2

MIGRATING NETWORKING CONFIGURATIONS

TECHNICAL FIELD

Aspects of the present disclosure relate to network policies in virtual environments, and more particularly, to migrating networking configuration of virtual machines to containers.

BACKGROUND

A hypervisor manages execution of virtualized resources. Communication between applications in virtualized execution environments, such as virtual machines, is facilitated by physical and/or virtual network components.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

As container orchestration systems become more widely used, virtual machines are being migrated to container orchestration system environments. Certain challenges arise with the migrating of virtual machines to container environments. One of those challenges includes migrating appropriate network configurations from the virtual machine to the container orchestration system. A virtual machine emulates a physical machine, including the physical network connections of a physical machine, referred to as level 2 networking. On the other hand, a container does not directly emulate a virtual machine and communicates with networks on a level similar to an application (e.g., level 3 networking). Therefore, the level 2 networking configurations of a virtual machine must be translated to the level 3 networking configurations of the container orchestration system to provide appropriate network access to processes and/or applications migrated from the virtual machine.

Conventional methods of migrating the networking configurations from virtual machines to containers include manual translation. However, manually translating the network configurations of a virtual machine to a container orchestration system is highly prone to errors, is cumbersome, and takes a substantial amount of time.

Aspects of the disclosure address the above-noted and other deficiencies by providing automatic networking configuration migration. An agent may execute on an operating system of a virtual machine. Upon receiving an indication that the virtual machine is to be migrated to a container orchestration system, the agent may retrieve network information associated with the virtual machine. The agent may retrieve information such as firewall rules, IP tables, interface configurations, and any other network information that may be used to identify network access needed by particular processes and applications. The agent may forward the network information to a migration controller of the container orchestration system. The migration controller may receive the network information and generate a new container networking configuration for a container in the container orchestration system. The container networking configuration may provide network access to the processes and/or applications migrated from the virtual machine to the container that is the same as, or similar to, the network access provided to the processes and applications while running on the virtual machine. Therefore, the networking configuration of the virtual machine can be automatically translated to the container in order to quickly and accurately provide network access expected and/or required by processes and applications migrated to a container.

Figure 1:
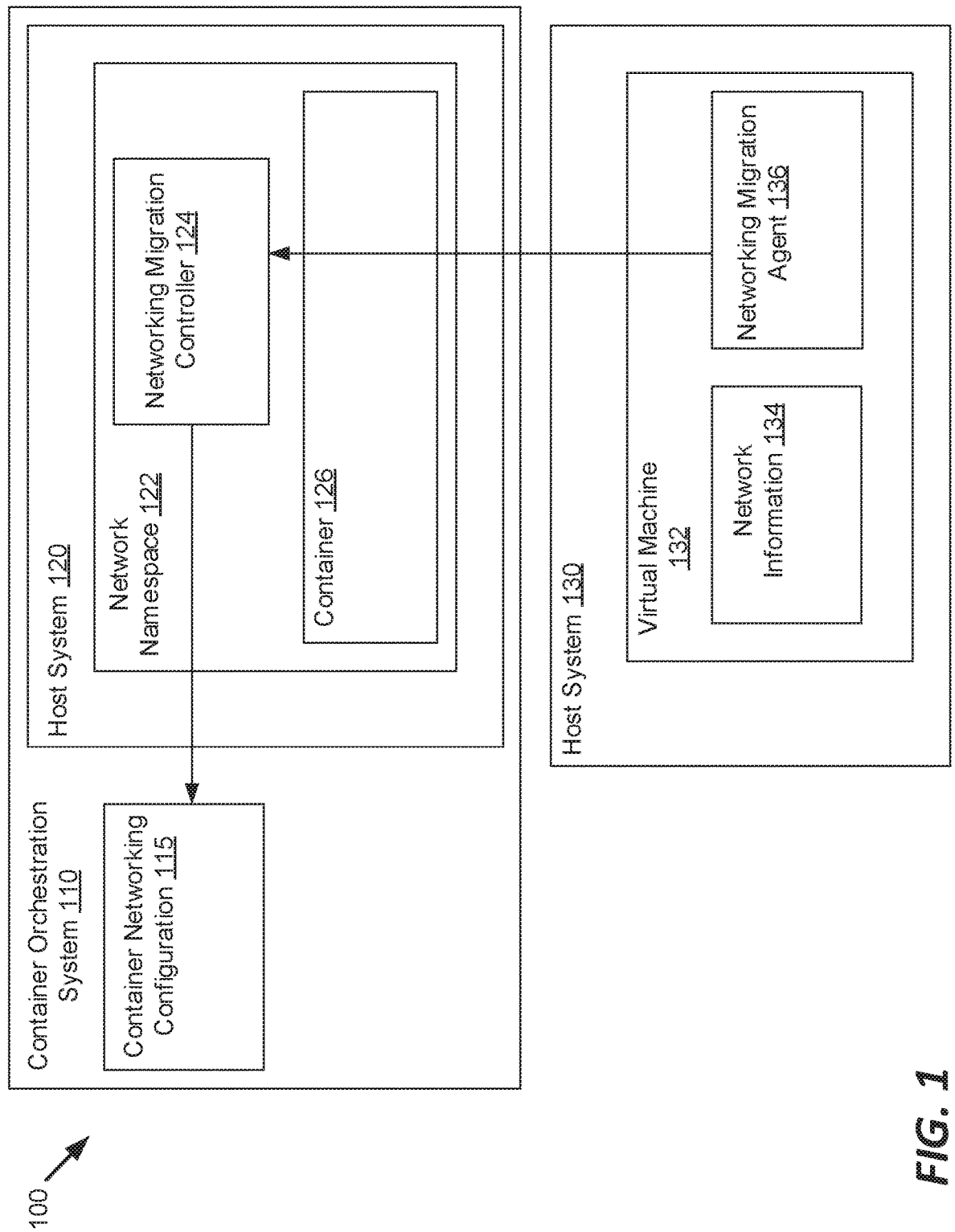
FIG. 1 is a block diagram that illustrates an example system for migrating virtual machine network configurations to a container, in accordance with some embodiments.

FIG. 1 is a block diagram that illustrates an example of a system 100 performing networking configuration migration in accordance with embodiments of the disclosure. The system 100 includes a container orchestration system 110 for organization and execution of containers. The container orchestration system 110 may deploy, on a host system 120, container 126 along with additional other containers in which to execute processes and applications securely within the isolated container environments. The system 100 may also include a virtual machine 132 running on a host system 130. In one embodiment, the virtual machine 132 is to be migrated from the host system 130 to host system 120 of the container orchestration system 110. Host systems 120 and 130 may include, but are not limited to, any data processing device, such as a desktop computer, a laptop computer, a mainframe computer, a personal digital assistant, a rack-mount server, a hand-held device or any other device configured to process data. In one example, the virtual machine 132 and/or the processes executing within the virtual machine 132 may be migrated to container 126 within a network namespace 122 of the host system 120.

Virtual machine 132 may include a networking migration agent 136. Networking migration agent 136 may retrieve network information 134 used by the virtual machine 132 and forward the network information 134 to the container orchestration system 110. The network information 134 may include any network information used by the virtual machine to provide network access to applications and processes executing on the virtual machine. For example, the network information may include internet protocol table (IP tables), firewall rules, network interface configurations, and so forth. The virtual machine 132 and container 126 may be connected to a public network (e.g., the Internet), a private network (e.g., a local area network (LAN), Wi-Fi, or a wide area network (WAN)), or a combination thereof. In one embodiment, the networking migration agent 136 may collect all the network information 134 in response to receiving an indication that the virtual machine 132 is to be migrated to a container (e.g., container 126). The networking migration agent 136 may forward the collected network information 134 to a networking migration controller 124 of the container orchestration system 110.

The networking migration controller 124 may receive the network information 134 from the networking migration agent 136 and generate a container networking configuration 115 based on the network information 134. After migration, the container networking configuration 115 may provide the same network access to the processes and applications as were provided by the virtual machine 132 prior to migration. For example, each application on the virtual machine may have particular network access provided by firewall rules, etc. After the migration, the same network access may be provided to the applications based on the firewall rules and other information, such as interface configurations, received from the networking migration agent 136.

In one example, the networking migration controller 124 uses the network information 134 to generate network access rules for internal network traffic and external network traffic. The networking migration controller 124 may use the network information 134 (e.g., firewall input and output rules) to generate network ingress traffic rules and network egress traffic rules for the container from IP addresses external to the container orchestration system 100. The networking migration controller 124 may also generate internal mesh rules for communication with other containers in the container orchestration system 100. In one example, the network information 134 may include zone based firewall rules. In this example, the networking migration controller 124 may use the zone based firewall rules to determine whether network traffic ingress and egress rules should be defined or whether service mesh rules should be defined. Additionally, the zone information may be used to determine if there are conflicts between the network information 134 and the container orchestration system 124. If conflicts are identified, the networking migration controller 124 may notify a user or administrator that manual intervention may be required. In another example, the networking migration controller 124 may identify forwarding rules included in the network information 134. The forwarding rules may then be used to automatically configure secondary networks for the container 126. The networking migration controller 124 may also use the forwarding rules to determine whether to suggest blocking the migration of virtual machine 132.

Figure 2:
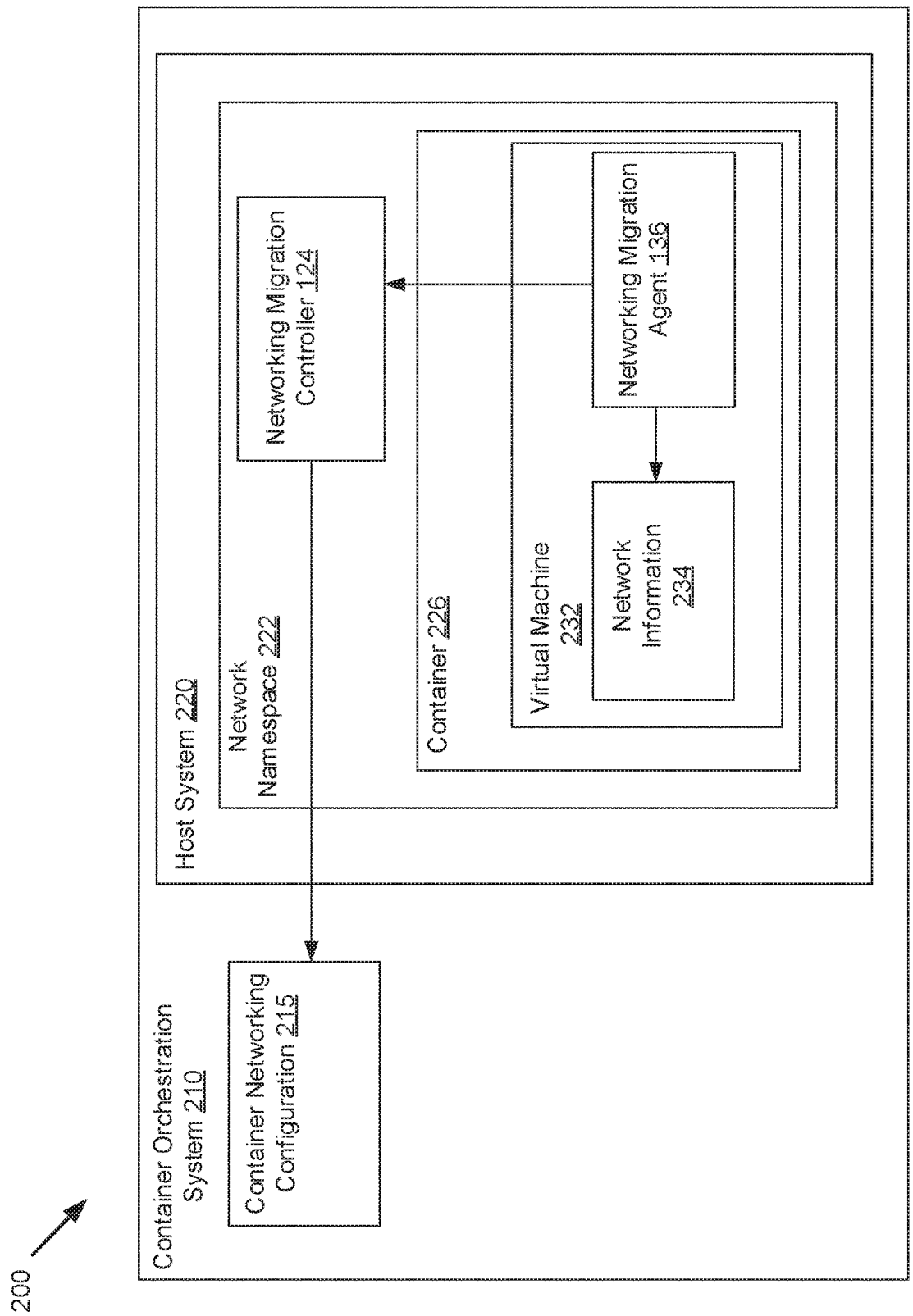
FIG. 2 is a block diagram that illustrates another example of a system for migrating virtual machine network configurations to a container in accordance with embodiments of the disclosure.

FIG. 2 is a block diagram that illustrates another example system 200 performing networking configuration migration in accordance with embodiments of the disclosure. System 200 includes a container orchestration system 210 which includes a host system 220. A virtual machine 232 may run within a container 226 which itself is located within a network namespace 222 of host system 220. In one example, a networking migration agent 136 is a daemon running on the virtual machine 232 to collect network information 234 and forward the network information 234 to a networking migration controller 124. As the virtual machine 232 continues to run within the container 226, the networking migration agent 136 may continuously collect and forward network information 234 to the networking migration controller 124. In one example, the networking migration agent 136 forwards updates or changes of the network information 234 to the networking migration controller 124. In another example, the networking migration agent 136 may intermittently collect and forward all network information 234 to the networking migration controller 124.

The networking migration controller 124 may receive the network information 234 and translate the network information 234 into a container networking configuration 215. In one example, the networking migration controller 124 may receive updates to the network information 234 when the networking migration agent 136 detects an update. The networking migration controller 124 may then update the container networking configuration 215 based on the updated network information 234. In another example, the networking migration controller 124 may continuously receive network information from the networking migration agent 136. The networking migration controller 124 may determine whether the network information 234 has been updated and update the container networking configuration 215 accordingly.

The container networking configuration 215 may provide network access to the virtual machine 232 and the processes and applications executing on the virtual machine through the container 226. Because the virtual machine 232 is executing within the container 226, the container may need the container networking configuration 215 to provide the appropriate network access required by the virtual machine 232.

The networking migration controller 124 may use the network information 234 (e.g., firewall input and output rules) to generate network ingress traffic rules and network egress traffic rules for the container to/from IP addresses external to the container orchestration system 210. The networking migration controller 124 may also generate internal mesh rules for communication with other containers in the container orchestration system 210. In one example, the network information 234 may include zone based firewall rules. In this example, the networking migration controller 124 may use the zone based firewall rules to determine whether network traffic ingress and egress rules should be defined or whether service mesh rules should be defined. Additionally, the zone information may be used to determine if there are conflicts between the network information 234 and the container orchestration system 210. If conflicts are identified, the networking migration controller 124 may notify a user or administrator that manual intervention may be required. In another example, the networking migration controller 124 may identify forwarding rules included in the network information 234. The forwarding rules may then be used to automatically configure secondary networks for the container 226. The networking migration controller 124 may also use the forwarding rules to determine whether to suggest blocking the migration of the virtual machine 232.

Figure 3:
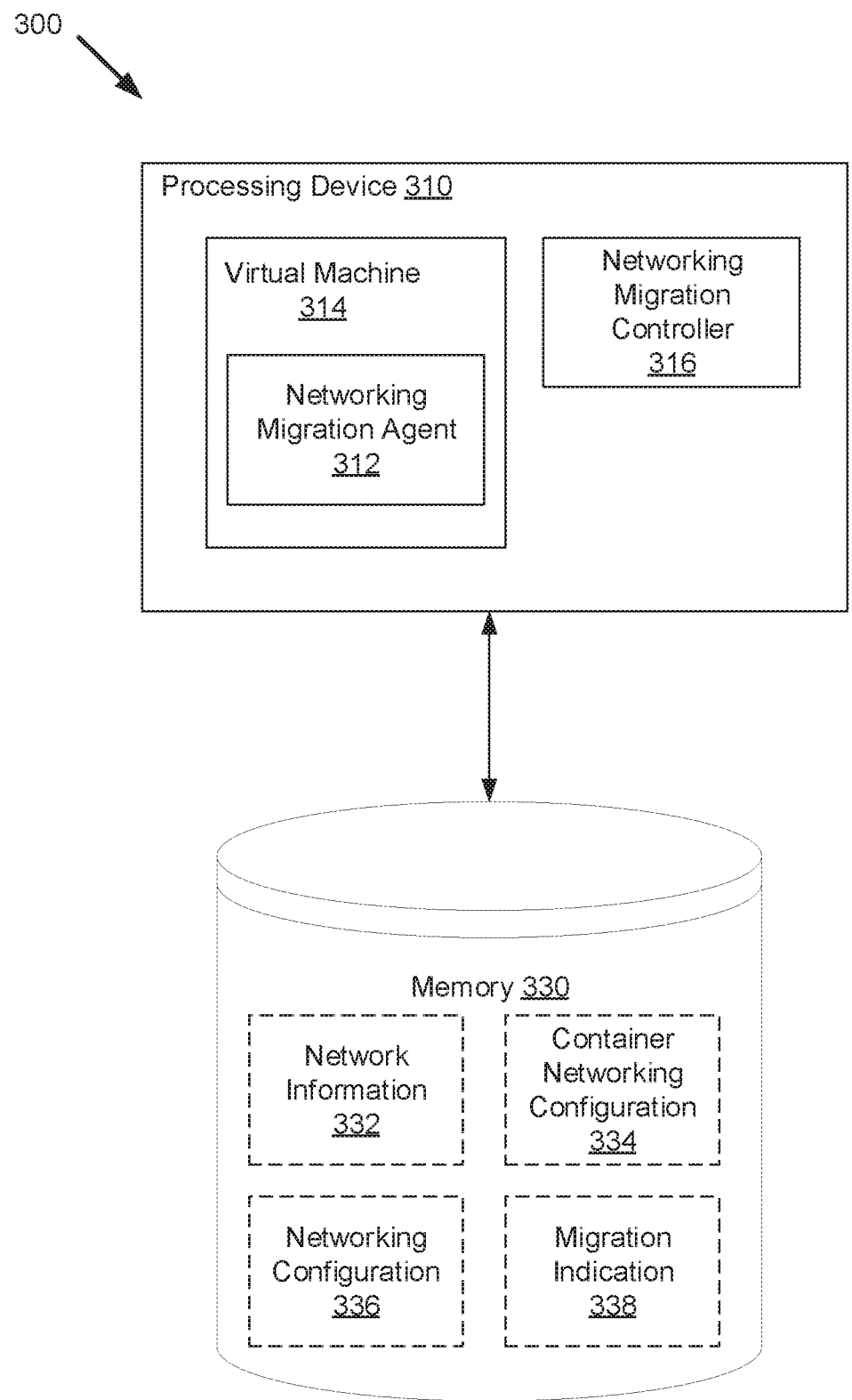
FIG. 3 is a block diagram illustrating the various components of a system for migrating virtual machine network configurations to a container in accordance with embodiments of the disclosure.

FIG. 3 is a block diagram of a system for migrating virtual machine networking configurations to a container. The system 300 includes a processing device 310 and a memory 330. The processing device 310 may execute a networking migration agent 312, a virtual machine 314, and a networking migration controller 316. The memory 330 may be operatively coupled to the processing device 310. The memory 330 may store network information 332 associated with the virtual machine 314, a container networking configuration 334, a networking configuration 336, and a migration indication 338. Although depicted as stored at memory 330, network information 332, container networking configuration 334, networking configuration 336 and migration indication 338 may, or may not, be stored at memory 330. For example, network information 332, container networking configuration 334, networking configuration 336 and migration indication 338 may be stored at the memory of a separate processing device, in a storage drive coupled to the processing device 310, or any other storage device coupled to, or in communication with, the processing device 310.

In one example, the networking migration agent 312 receives the migration indication 338 that the virtual machine 314 is to be migrated to a container. In response to receiving the migration indication 338, the networking migration agent 312 may retrieve the network information 332 associated with the virtual machine 314, the network information 332 corresponding to the networking configuration 336 of the virtual machine 314. The networking migration agent 312 may then forward the network information 332 associated with the virtual machine 314 to a networking migration controller 316, the networking migration controller 316 to generate a container networking configuration 334 based on the network information 332 of the virtual machine 314.

The networking migration agent 312 may monitor the virtual machine 314 and/or collect network information 332 from the networking configuration 336 of the virtual machine 314. The networking migration agent 312 may be executed by the virtual machine 314. Alternatively, the networking migration agent 312 may execute outside the virtual machine 314 and may communicate with the virtual machine 314 via a network connection. Upon receiving a migration indication 338 that the virtual machine is to be migrated to a container, the networking migration agent 312 may forward the network information to the networking migration controller 316. The networking migration controller 316 may be executed by the same processing device 310 as the virtual machine 314. In some embodiment the networking migration controller 316 may be executed by a separate processing device. The networking migration controller 316 may generate a container networking configuration 334 based on the network information 332.

Figure 4:
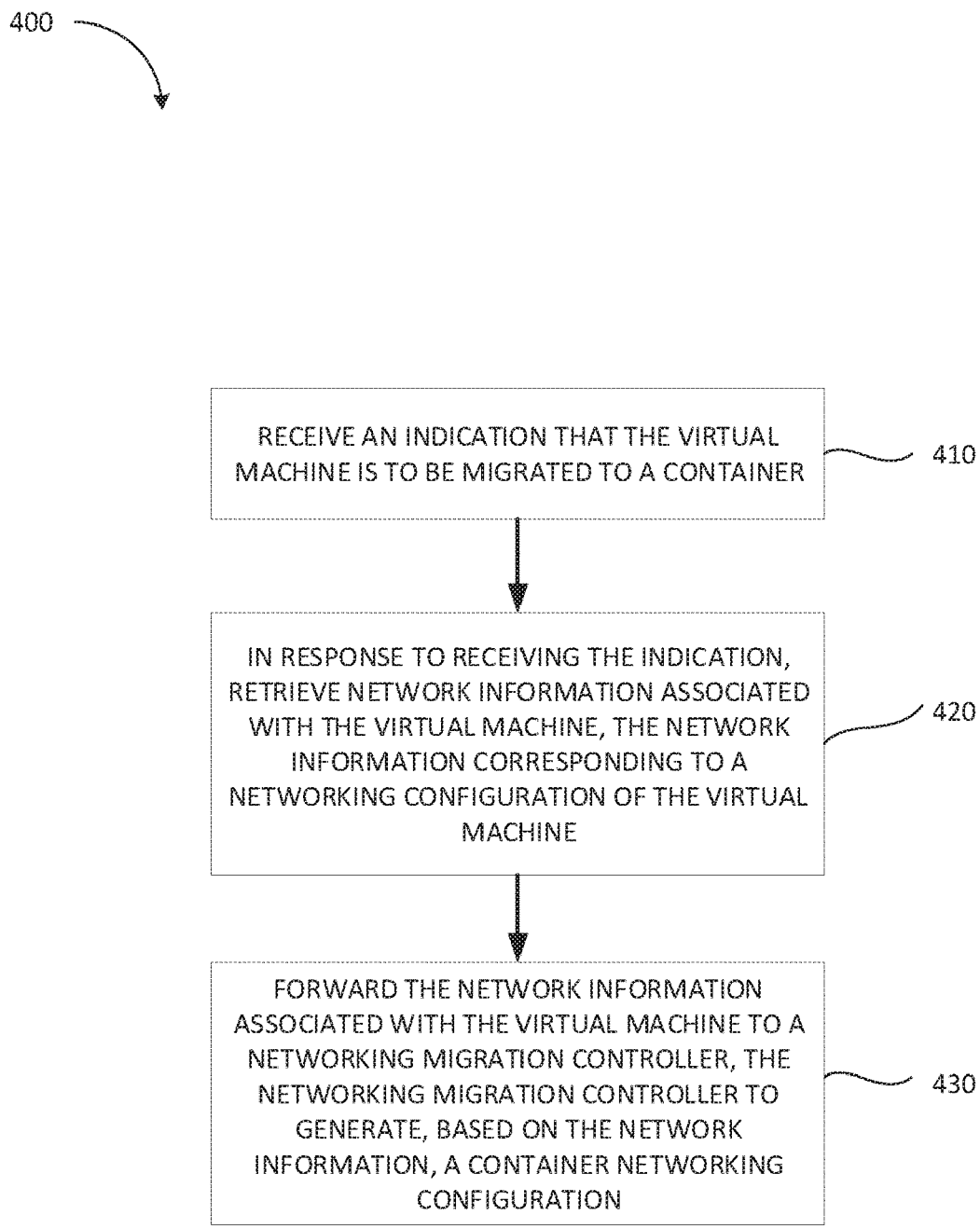
FIG. 4 is a flow diagram of a method of migrating a networking configuration of a virtual machine to a container, in accordance with some embodiments.

FIG. 4 is a flow diagram of a method 400 of virtual machine networking configuration migration, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by a networking migration agent 136 of FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 begins at block 410, where the processing logic receives an indication that a virtual machine is to be migrated to a container. In one example, the migration of the virtual machine may include the migration of the processes and applications from the virtual machine to a container managed by a container orchestration system. In another example, the entire virtual machine may be migrated to a container in which the virtual machine may continue to run.

At block 420, in response to receiving the indication, the processing logic retrieves network information associated with the virtual machine. The network information may correspond to a networking configuration of the virtual machine. The virtual machine may include firewall rules defining the network access, or restriction of network access, for each process and/or application on the virtual machine (similar to a physical machine). The network information may additionally include network interface configurations, IP tables defining the IP addresses of processes/applications, and any other rules defining network configurations of the virtual machine.

At block 430, the processing logic forwards the network information associated with the virtual machine to a networking migration controller. In one example, the processing logic collects all the network information and forwards it to the networking migration controller a single time (e.g., when there is a single migration and the virtual machine does not continue to execute). In another example, the processing logic continuously, or intermittently, collects and forwards the network information to the networking migration controller (e.g., when the virtual machine continues to execute within the container). In another example, the processing logic monitors the virtual machine for updates to the network information. Any updates to the network information identified may then be forwarded to the networking migration controller. The networking migration controller may then generate a container networking configuration based on the network information. The container networking configuration may provide expected network access to the processes migrated from the virtual machine to the container orchestration system.

Figure 5:
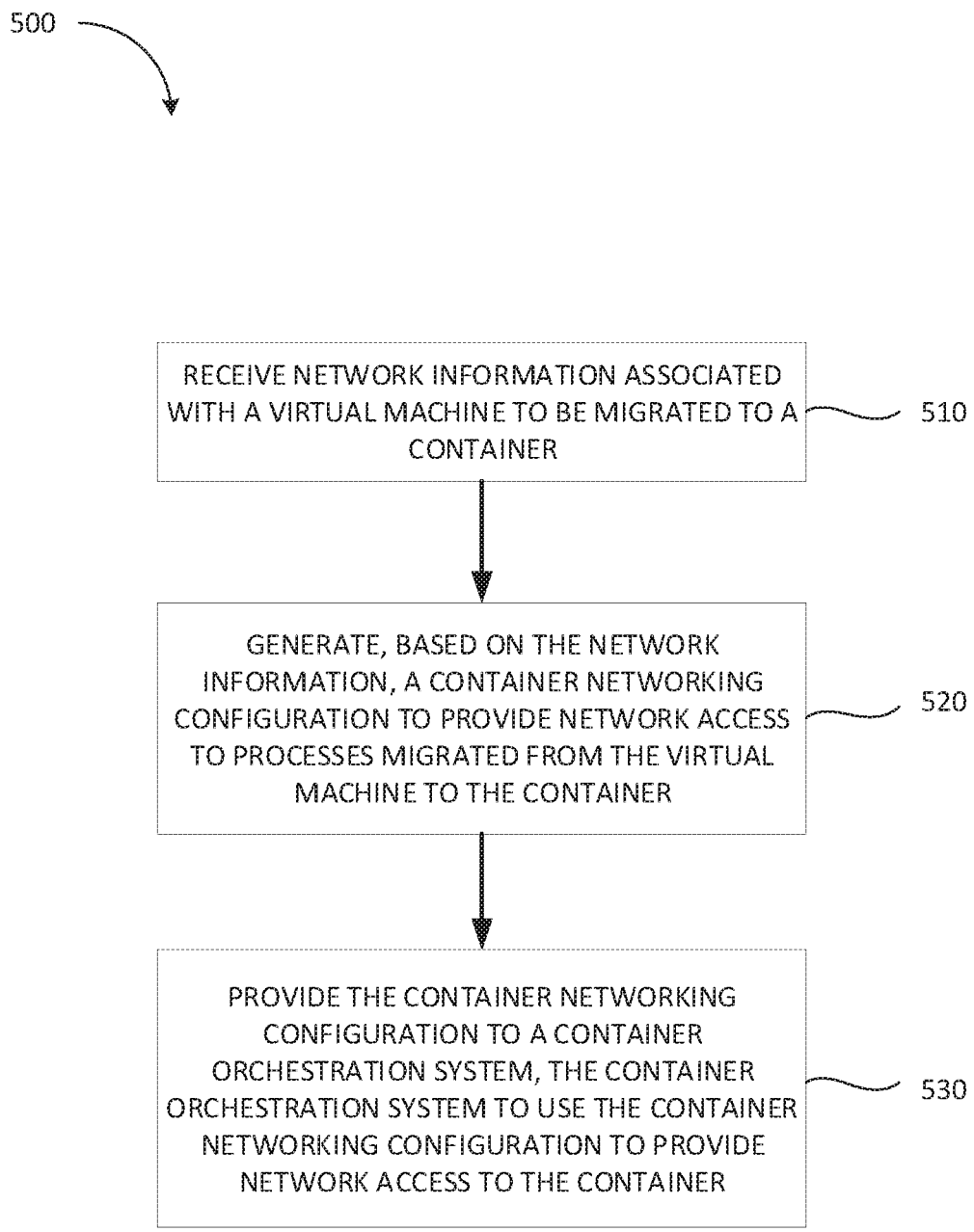
FIG. 5 is a flow diagram of another method of migrating a networking configuration of a virtual machine to a container, in accordance with some embodiments.

FIG. 5 is a flow diagram of a method 500 of virtual machine networking configuration migration, in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed by a networking migration component 124 of FIG. 1.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Method 500 begins at block 510, where the processing logic receives network information associated with a virtual machine to be migrated to a container. The network information may include any network rules or configurations identifying the network access provided to the virtual machine and the processes executing on the virtual machine. For example, the network information may include the firewall rules defining access via the network to the processes and applications on the virtual machine, IP tables, interface configurations, etc.

At block 520, the processing logic generates, based on the network information, a container networking configuration to provide network access to processes migrated from the virtual machine to the container. The container networking configuration may include network ingress traffic rules and network egress traffic rules for the container to/from IP addresses external to the container orchestration system. The container networking configuration may further include internal mesh rules for communication with other containers in the container orchestration system.

In one example, the network information may include zone based firewall rules. In this example, the processing logic may use the zone based firewall rules to determine whether network traffic ingress and egress rules should be defined or whether service mesh rules should be defined. Additionally, the zone information may be used to determine if there are conflicts between the network information and the container orchestration system. If conflicts are identified, the processing logic may notify a user or administrator that manual intervention may be required. In another example, the processing logic may identify forwarding rules included in the network information. The forwarding rules may then be used to automatically configure secondary networks. The processing logic may also use the forwarding rules to determine whether to suggest blocking the migration.

At block 530, the processing logic provides the container networking configuration to a container orchestration system, the container orchestration system to use the container networking configuration to provide network access to the container. The container orchestration system may apply the container networking configuration to the container to which the virtual machine is migrated to. The container may then be associated with network access rules that provide network access to the processes and applications migrated from the virtual machine to the container that are expected by those processes and applications (e.g., the same network access as was provided previously by the virtual machine before migration). In one example, the processes of the virtual machine may be migrated to separate containers. In such an example, the same rules that are determined above may be applied to each of the containers that receive one or more of the processes from the virtual machine. Alternatively, the processing logic may indicate that the networking migration does not support migration of the processes to separate containers.

Figure 6:
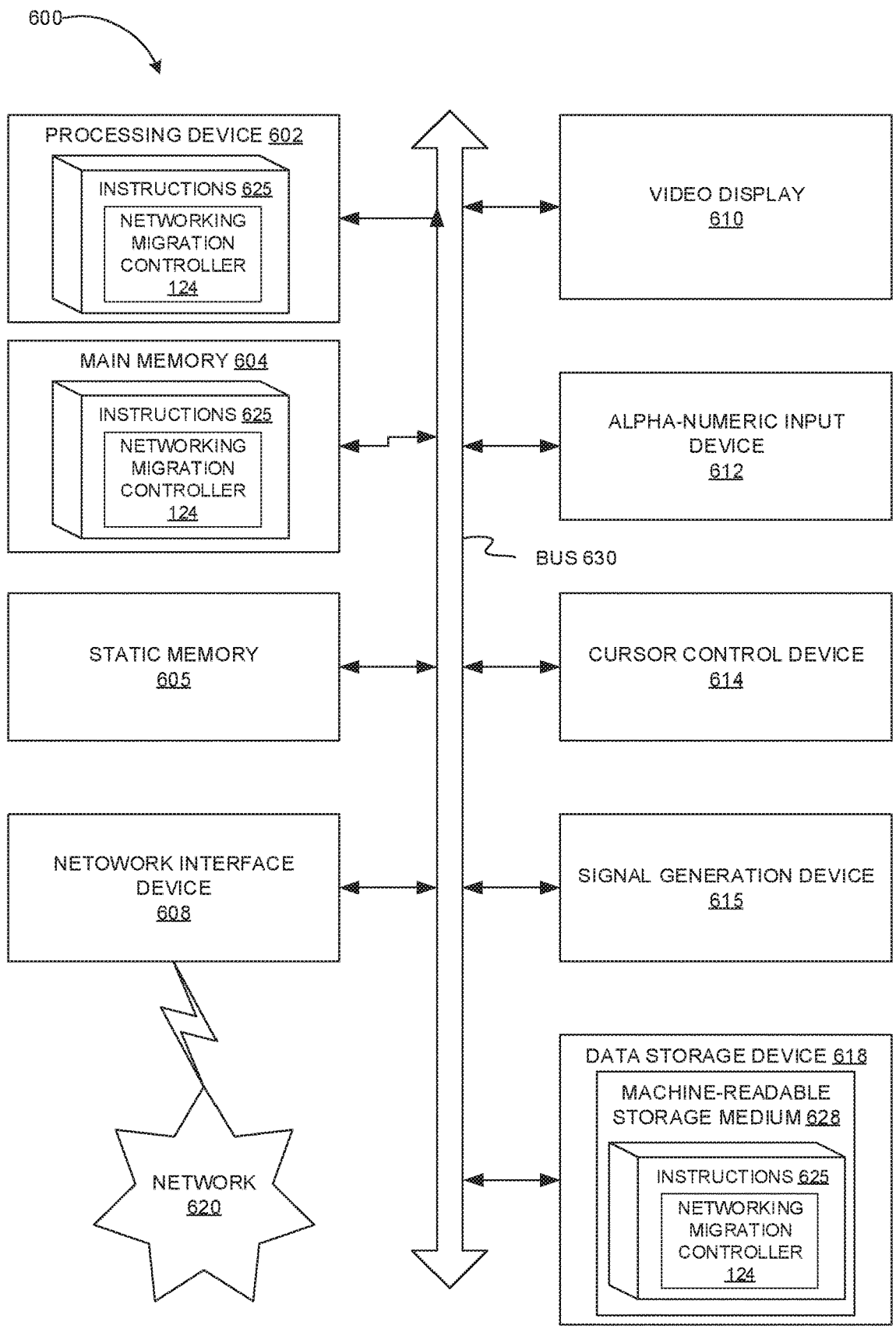
FIG. 6 is a block diagram of an example apparatus that may perform one or more of the operations described herein, in accordance with some embodiments of the present disclosure.

FIG. 6 is a block diagram of an example computing device 600 that may perform one or more of the operations described herein, in accordance with some embodiments. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for a networking migration controller, e.g., networking migration controller 124, or a networking migration agent, e.g., networking migration agent 136, for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
receiving, from an agent executing in a virtual machine, network information associated with the virtual machine, the virtual machine to be migrated to a container, wherein the container comprises an isolated execution environment managed by a container orchestration system;
generating, by a processing device, a container networking configuration in view of the network information associated with the virtual machine, the container networking configuration to provide network access to processes of the virtual machine migrated to the container, wherein the container networking configuration defines networking rules between containers and processes within the container orchestration system;
providing the container networking configuration to the container orchestration system, the container orchestration system to apply the container networking configuration to the container to provide network access to the virtual machine migrated to the container, wherein the virtual machine continues to execute within the container;
monitoring, by the agent in the virtual machine, the network information associated with the virtual machine to identify updates to the network information after migration of the virtual machine to the container; and
updating the container networking configuration in view of the updated network information after migration of the virtual machine to the container to maintain network access to the virtual machine through the container as the virtual machine continues to execute within the container.

2. The method of claim 1, further comprising:
configuring a secondary network for the container in view of the container orchestration system and the container networking configuration.

3. The method of claim 1, wherein generating the container networking configuration comprises:
generating network traffic ingress rules for communications received from systems external to the container orchestration system; and
generating network traffic egress rules for communications to systems external to the container orchestration system.

4. The method of claim 3, wherein generating the container networking configuration further comprises:
identifying network access associated with processes of the virtual machine;
generating at least one network access rule for a container to provide access to the processes migrated from the virtual machine; and
generating the container networking configuration including the at least one network access rule for the container.

5. The method of claim 1, further comprising:
identifying a conflict between the network information and the container orchestration system; and
recommending a user to perform a manual intervention.

6. The method of claim 1, wherein the network information comprises at least one of: an Internet protocol table, firewall configuration rules, or a network interface configuration.

7. The method of claim 1, wherein the container networking configuration defines networking rules between the container in the container orchestration system and networks external to the container orchestration system.

8. A system comprising:
a memory; and
a processing device operatively coupled to the memory, the processing device to:
receive, by an agent executed by the processing device, an indication that a virtual machine is to be migrated to a container, wherein the container comprises an isolated execution environment managed by a container orchestration system;
in response to receiving the indication, retrieve, by the agent, network information associated with the virtual machine, the network information corresponding to a networking configuration of the virtual machine;
forward, by the agent, the network information associated with the virtual machine to a networking migration controller, the networking migration controller to generate, in view of the network information of the virtual machine, a container networking configuration to be applied to the container to provide network access to the virtual machine executing within the container, wherein the container networking configuration defines networking rules between containers and processes within the container orchestration system;
monitor, by the agent, the network information associated with the virtual machine to identify updates to the network information after migration of the virtual machine to the container; and
provide, by the agent, the updated network information to the networking migration controller to update the container networking configuration after migration of the virtual machine to the container to maintain network access to the virtual machine through the container as the virtual machine continues to execute within the container.

9. The system of claim 8, wherein the network information comprises at least one of: an Internet protocol table, a firewall configuration, or a network interface configuration.

10. The system of claim 8, wherein the migration controller is further to provide the container networking configuration to a container orchestration system.

11. The system of claim 8, wherein the container networking configuration provides network access to at least one process migrated from the virtual machine to the container.

12. The system of claim 8, wherein the agent continuously retrieves and forwards the network information of the virtual machine to the networking migration controller.

13. A non-transitory computer-readable storage medium including instructions that, when executed by a processing device, cause the processing device to:
receive, from an agent executing in a virtual machine, network information associated with the virtual machine, the virtual machine to be migrated to a container, wherein the container comprises an isolated execution environment managed by a container orchestration system;
generate, by the processing device, a container networking configuration in view of the network information associated with the virtual machine, the container networking configuration to provide network access to processes migrated from the virtual machine to the container, wherein the container networking configuration defines networking rules between containers and processes within the container orchestration system;
provide the container networking configuration to the container orchestration system, the container orchestration system to apply the container networking configuration to the container to provide network access to the virtual machine migrated to the container, wherein the virtual machine continues to execute within the container;
monitor, by the agent in the virtual machine, the network information associated with the virtual machine to identify updates to the network information after migration of the virtual machine to the container; and
update the container networking configuration in view of the updated network information identified after migration of the virtual machine to the container to maintain network access to the virtual machine through the container as the virtual machine continues to execute within the container.

14. The non-transitory computer-readable storage medium of claim 13, wherein the processing device is further to:
configure a secondary network for the container in view of the container orchestration system and the container networking configuration.

15. The non-transitory computer-readable storage medium of claim 13, wherein to generate the container networking configuration, the processing device is further to:
identify network access associated with processes of the virtual machine;
generate at least one network access rule for a container to provide access to the processes migrated from the virtual machine; and
generate the container networking configuration including the at least one network access rule for the container.

16. The non-transitory computer-readable storage medium of claim 13, wherein the processing device is further to:
identify a conflict between the network information and the container orchestration system; and
recommend a user to perform a manual intervention.

17. The non-transitory computer-readable storage medium of claim 13, wherein the network information comprises at least one of: an Internet protocol table, firewall configuration rules, or a network interface configuration.

18. The non-transitory computer-readable storage medium of claim 13, wherein the container networking configuration defines networking rules between the container in the container orchestration system and networks external to the container orchestration system.

* * * * *